(12) United States Patent
Lissotschenko et al.

(10) Patent No.: US 7,256,928 B2
(45) Date of Patent: Aug. 14, 2007

(54) MODULATION DEVICE

(75) Inventors: Vitalij Lissotschenko, Fröndenberg (DE); Aleksei Mikhailov, Dortmund (DE)

(73) Assignee: Hentze-Lissotschenko Patentverwaltungs GmbH & Co, KG, Gerstengrund (DE)

( * ) Notice: Subject to any disclaimer, the term of this patent is extended or adjusted under 35 U.S.C. 154(b) by 129 days.

(21) Appl. No.: 10/505,173

(22) PCT Filed: Feb. 18, 2003

(86) PCT No.: PCT/EP03/01606

§ 371 (c)(1), (2), (4) Date: Feb. 10, 2005

(87) PCT Pub. No.: WO03/075074

PCT Pub. Date: Sep. 12, 2003

(65) Prior Publication Data

US 2005/0152023 A1      Jul. 14, 2005

(30) Foreign Application Priority Data

Mar. 1, 2002    (DE) .............................. 102 08 809

(51) Int. Cl.
 *G02B 26/08*  (2006.01)
(52) U.S. Cl. ................. 359/298; 359/245; 359/259
(58) Field of Classification Search ............... 359/298, 359/245, 259, 238, 240, 263, 302
See application file for complete search history.

(56) References Cited

U.S. PATENT DOCUMENTS

| | | | |
|---|---|---|---|
| 3,586,416 A | 6/1971 | Bitetto | |
| 3,676,866 A * | 7/1972 | Freedman | 365/64 |
| 4,854,677 A | 8/1989 | O'Mera | |
| 5,289,312 A * | 2/1994 | Hashimoto et al. | 359/487 |
| 5,640,473 A * | 6/1997 | Wheeler et al. | 385/27 |
| 2002/0145806 A1* | 10/2002 | Amm | 359/618 |
| 2003/0086179 A1* | 5/2003 | Kowarz et al. | 359/627 |

FOREIGN PATENT DOCUMENTS

DE            100 09 209         9/2001

\* cited by examiner

*Primary Examiner*—Timothy Thompson
(74) *Attorney, Agent, or Firm*—Hoffman, Wasson & Gitler, P.C.

(57) ABSTRACT

Modulation device for laser radiation, having at least one modulation means which can change at least in part the laser radiation which passes through the modulation device, the modulation device having splitter means which can split the laser radiation into at least two component beams of radiation, the device furthermore in the direction of beam propagation downstream of the beam splitter means having beam combining means which can recombine at least two of the component beams of radiation, and at least one modulation means being located between the beam splitter means and beam combining means such that at least one of the component beams can be changed by at least one modulation means such that the laser radiation which has been combined by the beam combining means or in the area of the beam combining means at least in a given area of space has the desired modulation as a result of the interference of at least two component beams.

12 Claims, 2 Drawing Sheets

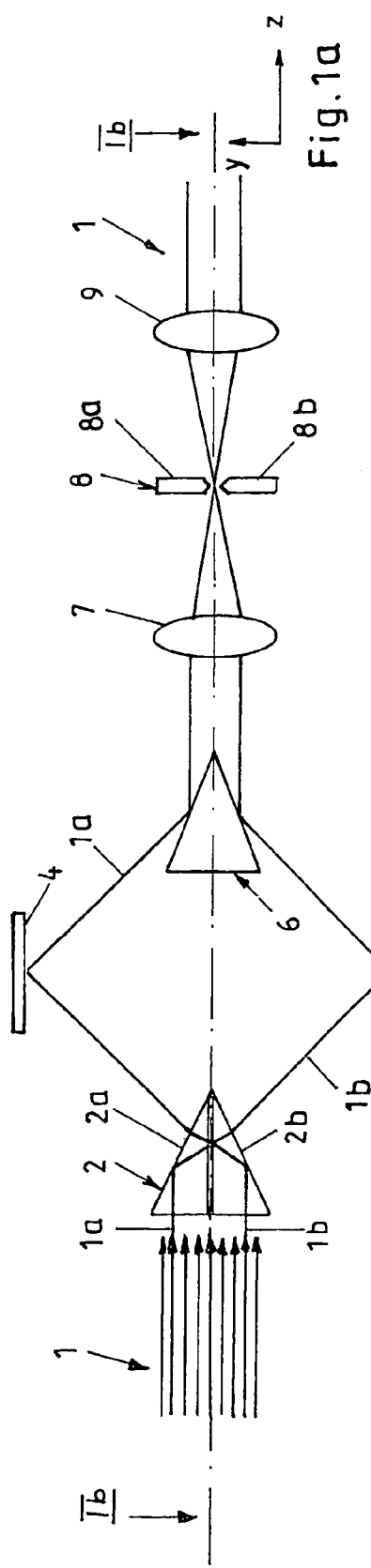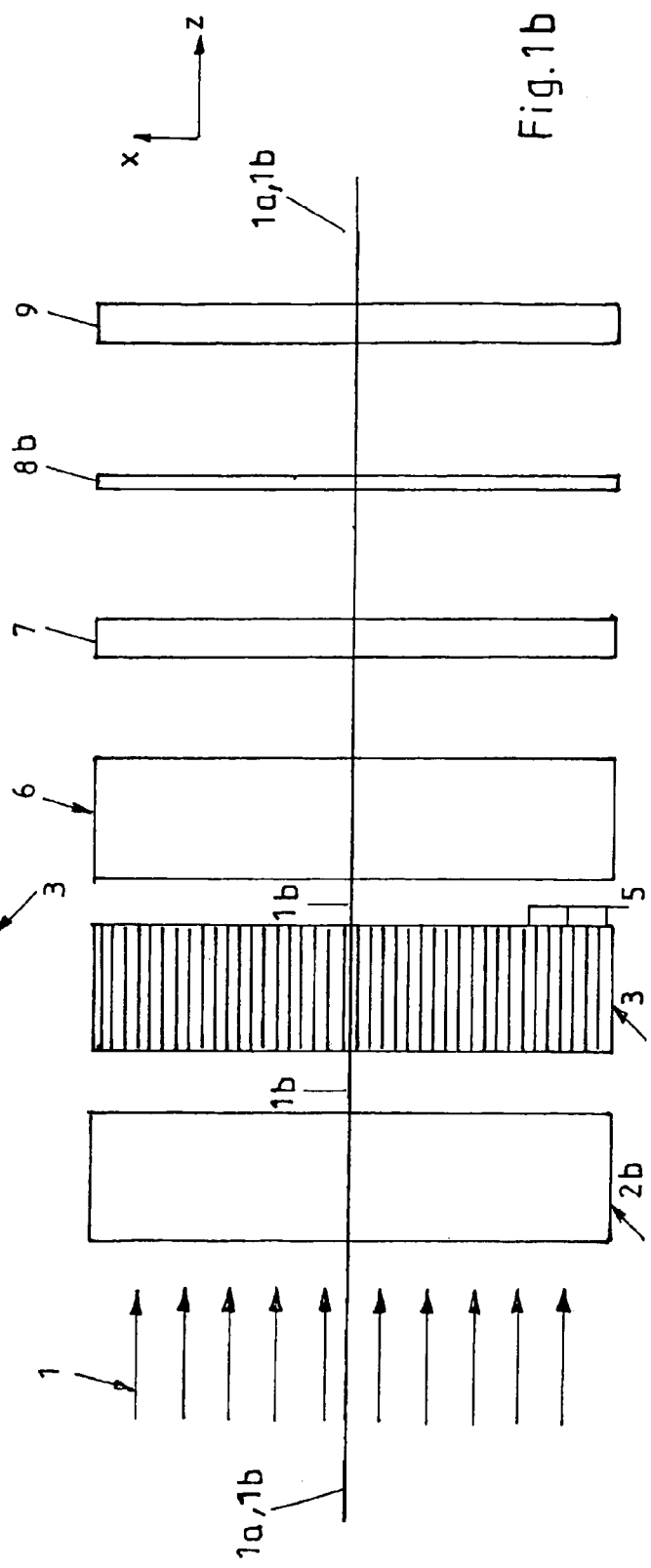

MODULATION DEVICE

BACKGROUND OF THE INVENTION

This invention relates to a modulation device for laser radiation, having at least one modulation means which can change at least in part the laser radiation which passes through the modulation device.

Modulation devices of the aforementioned type have been known for a long time. They can be used in different applications. Here for example laser printers, laser television, or even workpiece machining by laser radiation are to be named.

A typical modulation means used in the past is a so-called GLV modulator. Such a GLV modulator is operated in reflection. On its reflecting surface it has a whole number of crosspiece-shaped segments which are located parallel to one another and which can reflect the laser radiation. Each of these segments can be tilted in a concerted manner. Modulation occurs generally by two segments which are directly adjacent to one another being tilted differently or one of the segments being tilted and the other being left in its original position so that a small phase difference between the two adjacent component rays which are incident on these segments is formed by this different tilting of the two adjacent segments. This phase difference by direct interference in the area of the modulator leads to the propagation characteristic of the light which has been reflected by the modulator being able to be changed in a concerted manner.

The disadvantage here is the fact that intensely coherent light must be present for this purpose. In general, this is especially not the case in laser diode bars due to the extension of the individual emission sources of such a laser diode bar in the direction of arrangement of the emission sources (in the slow axis). Furthermore, it is also disadvantageous here that by the aforementioned peculiarity of the light emerging from a laser diode bar generally more than two adjacent, especially four or six segments adjacent to one another are illuminated, so that the resolution of such a modulation means is extremely poor. Furthermore, the individual states for the adjacent segments which are tilted toward one another and for the adjacent segments which are not tilted to one another, that is, the segments of a corresponding component area of the GLV modulator, can only be inadequately distinguished when a laser diode bar or a stack of laser diode bars is used as the laser source.

An object of this invention is to devise a modulation device of the initially mentioned type which is made more efficient, especially when using a laser diode bar or a laser diode stack as the laser light source.

SUMMARY OF THE INVENTION

The modulation device has beam splitter means which can split the laser radiation into at least two component beams of radiation, that the device furthermore in the direction of beam propagation downstream of the beam splitter means has beam combining means which can recombine at least two of the component beams of radiation, and that at least one modulation means is located between the beam splitter means and beam combining means such that at least one of the component beams can be changed by at least one modulation means such that the laser radiation which has been combined by the beam combining means or in the area of the beam combining means at least in a given area of space has the desired modulation as a result of the interference of at least two component beams. In such a device, the advantage is that by splitting into two component beams corresponding to one another, the quality and the resolution of the modulation are independent of the coherence of the laser radiation used.

According to one preferred embodiment of this invention, the laser radiation at least in sections in a first direction, which is perpendicular to the middle direction of propagation, has a greater divergence than in a second direction, which is perpendicular to the middle direction of propagation and to the first direction, the separation into component beams taking place in the first direction. Especially when using a laser diode bar, the first direction corresponds to the greater divergence of the fast axis, conversely the second direction corresponds to the smaller divergence of the slow axis. If thus, the separation takes place in the first direction, and thus in the direction of the fast axis, the change of the corresponding component beam will likewise take place in the direction of the fast axis so that here in addition the greater coherence of the laser radiation in the fast axis direction is still used.

It can be provided that the beam splitter means be made as a prism, especially as an at least partially mirrored prism. Alternatively, the beam splitter means could also be made as a partially transparent mirror.

Furthermore, it can be provided that the beam combining means be made as a prism, especially as an at least partially mirrored prism. Alternatively, the beam combining means could also be made as a partially transparent mirror.

According to one preferred embodiment of this invention, at least one modulation means can change at least one component beam of radiation such that it undergoes phase concerted shifts of individual or all component rays, especially by half the wavelength of the laser radiation. Here there is a clear difference from the existing art in which within the component beam a phase shift to one another was imparted to adjacent component rays. Non-adjacent component rays of the same component beam are provided with a phase shift to one another, but a phase shift is induced especially only in one of the two component beams by a modulation means so that only after combining the two component beams, at the beam combining means or in the area of the beam combining means or downstream of the beam combining means, is modulation caused by interference. In this way, for the case in which the modulation means are made as a modulator which is to be operated in reflection, especially as a GLV modulator, two or four or six segments of the modulator which are adjacent to one another no longer contribute to a modulation point or to a modulation bit, but in the preferred case only one individual element does so. In this way of course the resolution with which the laser radiation can be modulated can be greatly increased.

It is alternatively conceivable for the modulation means to be made as a modulator which is to be operated in transmission.

Moreover, it is possible for the modulation means to be made as a two-dimensional modulator with which laser radiation incident on it can be modulated with respect to two directions which are essentially perpendicular to one another. In this way, two-dimensional information can be modulated onto the laser radiation and at least in areas can make line-by-line scanning in a printing process or the like superfluous.

It is conceivable that the modulation device can use even a three-dimensional modulator with which laser radiation incident on it can be modulated with respect to three directions which are essentially perpendicular to one another.

A modulation device including beam splitter means, modulation means and beam combining means can be regarded as an interferometer. For a modulation device as claimed in the invention, thus with respect to the arrangement of the aforementioned elements to one another all known types of interferometers, such as for example a Michelson interferometer, are suited.

According to one preferred embodiment of this invention, in the direction of beam propagation downstream of the beam combining means, there is a diaphragm which can mask out parts of the laser radiation corresponding to the modulation which is to be achieved. Here it can be provided that in the beam propagation direction upstream and/or downstream of the diaphragm there are lens means, especially cylinder lenses which can image or focus the laser radiation onto the diaphragm and/or following the diaphragm can re-collimate the focussed laser radiation. Due to the fact that propagation of the recombined laser radiation in certain directions is enabled and in certain directions is prohibited by the interference caused by the modulation means in the area of the beam combining means or downstream of the beam combining means, a diaphragm is very well suited to masking out certain desired portions of the laser radiation which for example correspond to a logic "0" when digital information is modulated on. Likewise, the portion of the laser radiation which is passed through the diaphragm will correspond to a logic "1".

It can be provided that the laser radiation be divided into component beams, that subsequently at least one of the component beams is phase-shifted according to the modulation which is to be achieved, and that subsequently the component beams are combined such that the desired modulation is achieved by interference of the two component beams. This process provides one skilled in the art with a method with which he can achieve very effective modulation of high resolution with simple means. In particular, this can take place by the aforementioned masking out of parts of the combined laser radiation which correspond for example to a logic "0". Furthermore, for the case in which the laser radiation of a laser diode bar in the direction of the fast axis is divided into two component beams, as a result of introducing a phase shift in the fast axis direction the quality of the modulation is greatly increased compared to the modulation process known from the existing art.

BRIEF DESCRIPTION OF THE DRAWINGS

Other features and advantages of this invention become clear from the following description of preferred embodiments with reference to the attached figures.

FIG. 1 shows a side view of the modulation device as claimed in the invention;

FIG. 1b shows a view according to arrows 1b-1b in FIG. 1a;

FIG. 3a shows a schematic diagram which illustrates the relationship between the intensity and propagation angle of the state in FIG. 2a.

DETAILED DESCRIPTION OF THE INVENTION

Figure 2A:
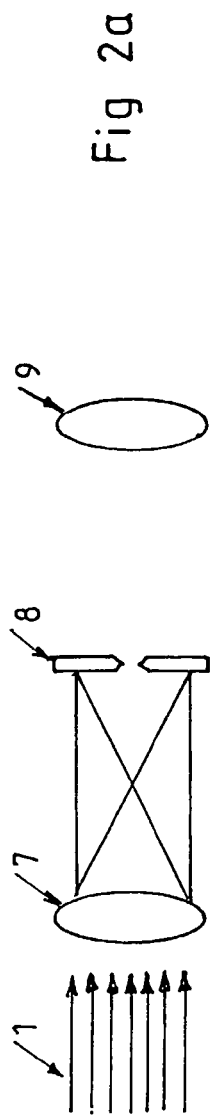
FIG. 2a shows a detailed view of the modulation device as shown in FIG. 1a in a first state.

Laser radiation 1 which is incident on the modulation device can emerge from a laser light source which is made, for example, as a laser diode bar. The laser light source in one direction, in FIG. 1a and FIG. 1b in the X direction, thus has a comparatively extended cross section with many line emission sources which extend in the X direction and which are located next to one another. Furthermore, the laser light source which is made as a laser diode bar in the direction perpendicular thereto, specifically in the Y direction, has a very short extension of, for example, 1 micron. In this Y direction, which is called the fast axis, the divergence is much greater than in the X direction which is called the slow axis.

A modulation device as claimed in the invention is shown in FIG. 1a and FIG. 1b. The modulation device includes beam splitter means 2 which can divide the laser radiation 1 incident on it into two component beams. In FIG. 1a, this division is illustrated by means of two arbitrarily selected component rays 1a and 1b. The beam splitter means 2 in the illustrated embodiment, has two prisms 2a, 2b which are alike one another, lie on top of one another with two corresponding leg sides, and are cemented to one another. FIG. 1a shows that the two component rays 1a, 1b enter two separate halves of the beam splitter means 2, specifically two different prisms 2a, 2b. After reflection on the respective hypotenuse sides, they are reflected a second time on the leg sides which are cemented to one another. The latter can be mirrored. Subsequently they emerge from the hypotenuse sides of the prisms 2a, 2b such that they are deflected up and down roughly at an angle of 45° to the original direction Z of propagation. In this way, the laser radiation is divided into two component beams which move way from one another up and down in FIG. 1a from the beam splitter means 2.

The component beam which is moving up in FIG. 1a is reflected on a mirror 4 such that it is reflected down at an angle of −45° to the Z direction. This is illustrated by the component beam 1a which has been selected by way of example. The component beam which has been deflected down, as is illustrated on the sample component ray 1b, is reflected up by the modulation means 3 likewise at an angle of roughly 45° to the Z direction. The modulation means 3 can be made as a GLV modulator. In particular, the modulation means 3 can have segments 5 which are located next to one another in the transverse direction, i.e. in the X direction in FIG. 1b, especially crosspiece-shaped segments. The crosspiece-shaped segments 5 can reflect the light which is incident on them, as is shown for the component ray 1b. In particular, it is possible for the tilt angle of the individual crosspiece-shaped segments 5 to be changed such that the optical path of the component ray 1b is made larger or smaller by a short distance which can correspond especially to the amount of half the wavelength of the laser radiation. The individual segments 5 are to extend over the entire width in the X direction in FIG. 1b. Thus the corresponding segment 5 can be tilted or not tilted in a concerted manner at a certain point in the X direction. In this way the component beams of the laser radiation 1 which are incident on the modulation means 3 may or may not be provided with a phase difference of half the wavelength in a concerted manner for different X coordinates.

The modulation device furthermore includes a beam combining means 6 which combines the component beams which have been reflected by the modulation means 3 and the mirror 4 so that the re-combined laser radiation 1 propagates in the positive Z direction in FIG. 1a and FIG. 1b. This beam combination means 6 is made as a prism, on the external, optionally mirrored sides of which the component beams are reflected such that they move in the positive Z direction after reflection. The component beams which have been recombined with one another in this way under certain circumstances according to the positions of the individual segments 5 of the modulation means 3 have local phase differences of for example half the wavelength of the laser radiation used.

Following the beam combining means 6, in the Z direction there are in succession a cylinder lens 7 with a cylinder axis which extends in the X direction, a diaphragm 8 and another cylinder lens 9 with a cylinder axis which likewise extends in the X direction. Here, as is apparent from FIG. 1a, the diaphragm 8 is located at a distance from the cylinder lens 7 or from the cylinder lens 9, which corresponds rather exactly to the focal lengths of these cylinder lenses 7,9, the focal lengths of the cylinder lens 7 and the cylinder lens 9 being the same. Since in this way the two cylinder lenses 7, 9 are located at a distance to one another which corresponds to twice the focal length, the laser radiation 1 which is parallel to the Z direction before entering the cylinder lens 7 will be parallel in turn to the Z direction after emerging from the cylinder lens 9. The diaphragm 8 consists of two diaphragm parts 8a, 8b which are located on top of one another in the Y direction, the gap between them extending in the X direction. The gap present between the diaphragm parts 8a, 8b is located essentially exactly on the focal line of the two cylinder lenses 7, 9.

Figure 2B:
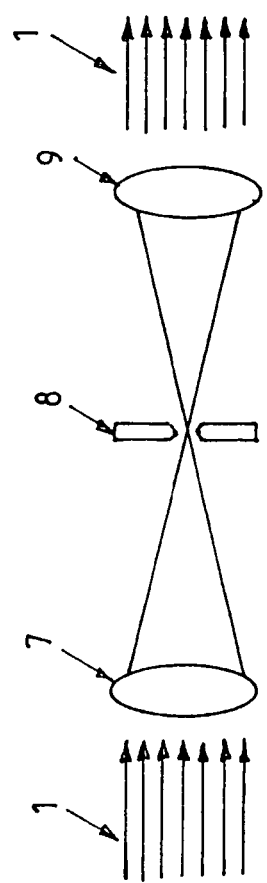
FIG. 2b shows a view as shown in FIG. 2a in a second state.
Figure 3A:
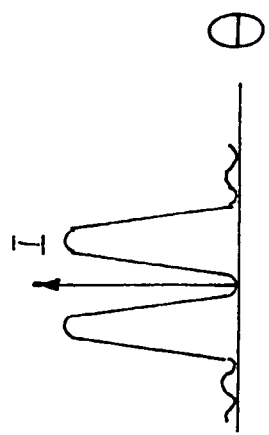

FIGS. 2a, 2b show two different cases. In the first case, it is assumed that for the imaged parts of the laser radiation 1, the corresponding segments 5 of the modulation means 3 were tilted such that the parts of the laser radiation 1 which have been reflected by the modulation means 3 have a phase difference of λ/2, i.e. of half the wavelength of the laser radiation used, relative to the corresponding parts of the laser radiation 1 which have been reflected by the mirror 4. These parts of the laser radiation will thus not be able to propagate exactly in the Z direction after recombination in the beam combining means 6 as a result of interference. This is illustrated in FIG. 3a in which the intensity I in arbitrary units is plotted against angle θ, the angle θ indicating the angle between the Z axis and the direction of propagation of the laser radiation 1. FIG. 3a which shows simply a schematic illustrates that in the direct Z direction no propagation of the parts of the laser radiation which are interfering with one another occurs. This is shown in FIG. 2 by the laser radiation 1 which has been focussed by the lens 7 in the area of the diaphragm 8, thus in the area of the focal plane, being focussed not in the XZ plane, but shortly above and shortly underneath the XZ plane. As a result of introducing the diaphragm 8 into the radiation path thus laser radiation 1 which has been modulated in this way will not emerge to the right, i.e. not in the positive Z direction, from the diaphragm 8.

Figure 3B:
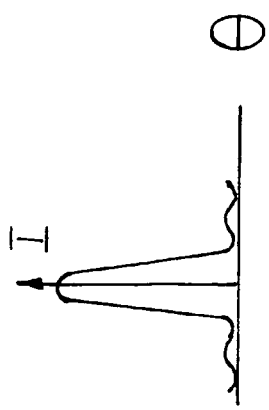
FIG. 3b shows a diagram which corresponds to FIG. 3a and which illustrates the state in FIG. 2b.

FIGS. 2b and 3b show parts of the laser radiation 1 in which the corresponding segment 5 of the modulation means 3 has not been titled so that these parts of the laser radiation 1 which have been reflected by the modulation means 3 do not undergo a phase shift so that destructive interference after combination by the beam combining means 6 does not occur. In this case FIG. 3b illustrates that the propagation peak lies roughly in the Z direction. This case is also illustrated in FIG. 2b in which the focal line of the laser radiation 1 which has been focussed by the cylinder lens 7 lies essentially in the area of the diaphragm 8 in the XZ plane. This results in that this part of the laser radiation passes essentially unhindered through the diaphragm 8 and after passing through the second cylinder lens 9 propagates parallel to the Z axis in the positive Z direction.

It is possible, instead of the beam splitter means 2, to use other beam splitter means. They could be beam splitter means which correspond roughly to the beam combining means 6. Furthermore, instead of the beam combining means 6 other beam combining means can also be used, for example beam combining means which correspond essentially to the beam splitter means 2.

It is also possible, instead of the modulation means 3 which is made as a GLV modulator, to use other modulation means. In particular it is also possible to use modulation means which can cause two-dimensional modulation of the light which is incident on the modulation means. For example, here the light emerging from the two-dimensional light source, such as the light of a stack of laser diode bars, can be modulated accordingly. What is important is simply that a component beam, specifically the component beam which has been deflected down in FIG. 1a, with the component ray 1b which has been selected by way of example, is provided concertedly in individual component sections with a phase shift. The individual component sections in which the phase shift is carried out can be stipulated by information which is to be modulated onto the laser radiation 1. The information can be for example printing information or also information for laser television or information for machining of a workpiece or the like.

It is furthermore possible to use a reflecting modulation means instead of the mirror 4. What is important here is simply that between the individual component areas of the separated laser radiation 1 which correspond to one another a definable phase difference can be produced in order to allow individual component areas through the diaphragm 8 or to have them blocked by the diaphragm 8.

The description of the illustrated embodiment of the modulation device clearly shows that the principle of the modulation device is similar to that of an interferometer.

It is possible to collimate the laser radiation 1 emerging for example from a laser diode bar upstream or downstream or in the area of the modulation device with respect to its fast axis divergence and with respect to its slow axis divergence with the corresponding means known from the prior art. With respect to fast axis divergence they are cylinder lenses with cylinder axes which are aligned in the X direction. With respect to slow axis divergence they are arrays of cylinder lenses with cylinder axes which are aligned in the Y direction.

The invention claimed is:

1. In combination, laser radiation and a modulation device, A modulation device for laser radiation, the modulation device comprising at least one modulation means which can change at least in part the laser radiation which passes through the modulation device, wherein the modulation device comprises beam splitter means which can split the laser radiation into at least two component beams of radiation, that the device furthermore in the direction of beam propagation downstream of the beam splitter means comprises beam combining means which can recombine at least two of the component beams of radiation, and that the at least one modulation means is located between the beam splitter means and the beam combining means such that at least one of the component beams can be changed by the at least one modulation means such that the laser radiation which has been combined by the beam combining means or in an area of the beam combining means at least in a given area of space has the desired modulation as a result of the interference of at least two component beams, wherein the laser radiation has, at least in sections, in a first direction (Y), the fast axis, which is perpendicular to the middle direction (Z) of propagation, a greater divergence than in a second direction (X) the slow axis, which is perpendicular to the middle direction (Z) of propagation and to the first direction (Y), the separation into component beams taking place in the first direction (Y).

2. The combination as claimed in claim 1, wherein the beam splitter means are made as a prism, or as an at least partially mirrored prism.

3. The combination as claimed in one of claim 1, wherein the beam splitter means are also made as a partially transparent mirror.

4. The combination as claimed in claim 1, wherein the beam combining means are made as a prism, or as an at least partially mirrored prism.

5. The combination as claimed in claim 1, wherein the beam combining means are made as a partially transparent mirror.

6. The combination as claimed in claim 1, wherein the at least one modulation means can change at least one component beam of radiation such that it undergoes a concerted phase shift of at least one of its component rays, by half the wavelength of the laser radiation.

7. The combination as claimed in claim 1, wherein the at least one modulation means are made as a modulator which is to be operated in reflection, as a GLV modulator.

8. The combination as claimed in claim 1, wherein the at least one modulation means are made as a modulator which is to be operated in transmission.

9. The combination as claimed in claim 1, wherein the at least one modulation means are made as a two-dimensional modulator with which laser radiation which is incident on it can be modulated with respect to two directions which are essentially perpendicular to one another.

10. The combination as claimed in claim 1, wherein an interferometer is formed by the beam splitter means, the modulation means and the beam combining means.

11. The combination as claimed in claim 1, wherein in the direction (Z) of beam propagation downstream of the beam combining means there is a diaphragm which can mask out parts of the laser radiation corresponding to the modulation which is to be achieved.

12. The combination as claimed in claim 11, wherein in the direction (Z) of beam propagation upstream and/or downstream of the diaphragm there are lens means, cylinder lenses which can focus the laser radiation onto the diaphragm and/or following the diaphragm can re-collimate the focused laser radiation.

* * * * *